Dec. 16, 1969 W. REICHARDT 3,483,851
FUEL INJECTION CONTROL SYSTEM
Filed Nov. 2, 1967 3 Sheets-Sheet 2

INVENTOR
Wolfgang REICHARDT

United States Patent Office 3,483,851
Patented Dec. 16, 1969

3,483,851
FUEL INJECTION CONTROL SYSTEM
Wolfgang Reichardt, Stuttgart-Rohr, Germany, assignor to Robert Bosch, GmbH, Stuttgart, Germany, a limited-liability company of Germany
Filed Nov. 2, 1967, Ser. No. 680,068
Claims priority, application Germany, Nov. 25, 1966, B 90,009
Int. Cl. F02b *3/00;* F02d *1/04, 1/06*
U.S. Cl. 123—32       34 Claims

ABSTRACT OF THE DISCLOSURE

Fuel injection valves are operated by pulses derived from a pair of monostable multi-vibrators fed through an OR gate so that the opening time of the fuel injection valves is determined by the combined pulse times of both multi-vibrators; each multi-vibrator has a shorter pulse time than the total opening time of the valves, and the pulse time of at least one multi-vibrator can be determined by factors multiplicatively (speed; and for example, engine temperature) as well as additively (for example, effect of battery voltage; starting conditions) related to the operating parameter of the engine.

---

Figure 1:
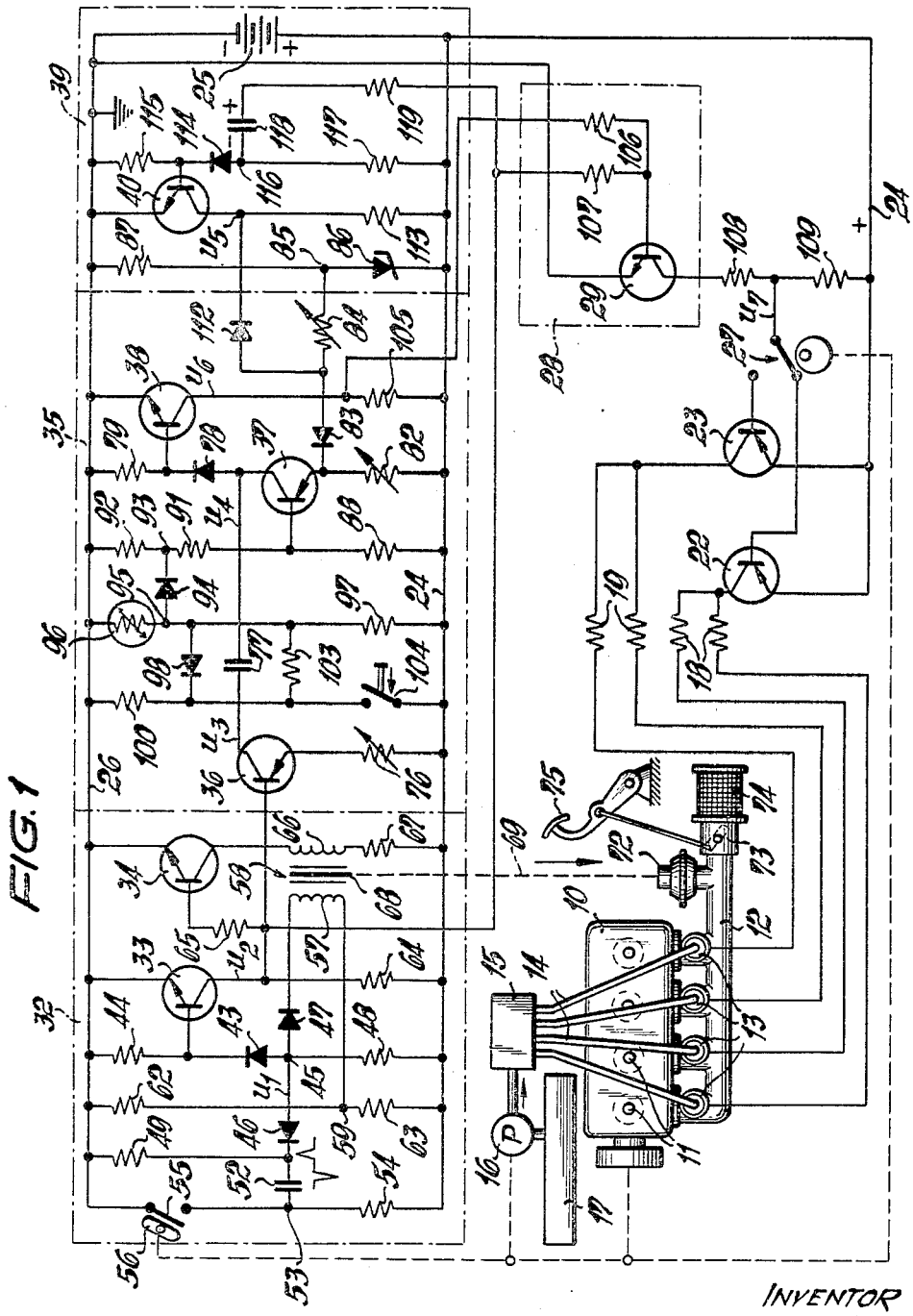

The present invention relates to a fuel injection control system for internal combustion engines, and particularly for internal combustion engines for automotive use in which fuel is injected under pressure at a point adjacent the inlet stubs of the cylinders.

The opening time of the valves which inject fuel is determined by a pulse generator circuit, preferably a monostable multi-vibrator, having an impulse period which is a function of an operating parameter of the engine. The amount of fuel injected will thus be a function of a pulse time, that is, the unstable condition of the monostable multi-vibrator circuit. The pulse time of the multi-vibrator circuit can readily be controlled by controlling an R–C or an L–R circuit.

The pulse time, and hence the period during which fuel is injected, which may be termed the injection time, can be made dependent on various operating condtions or parameters of the engine, for example: vacuum, or absolute pressure, in the intake manifold; the speed of the engine; engine temperature. Other operating conditions of the engine in a prime mover system can also be considered, for example: voltage of the vehicle battery; or special requirements, such as start-up conditions. Operating potential for the circuit, which is normally connected to the vehicle battery, can vary within wide limits in dependence on the charge state of the battery and the load placed thereon.

The time during which fuel is injected should be so chosen that the fuel is completely burned under all operating conditions. Thus, best fuel economy can be obtained regardless of the speed of the engine or the load placed thereon; further, pollution caused by exhaust gases from the engine will be a minimum since incomplete combustion can be avoided. The operating parameters which influence the injection time can be placed in two groups. One group affects the injection time by a constant amount independently of the instantaneous injection time being commanded, that is, they increase, or decrease the injection time by a fixed value. This can be termed additive correction. An example of such an additive correction is correction of injection time to compensate for variations in battery voltage. The other group changes the injection time proportionately by a certain factor which depends on the instantaneous injection time itself, in an increasing, or decreasing direction. A change of, for example, ten percent, causes a larger increase (or decrease) if the instantaneous injection time is larger than during short injection periods. This correction may be termed a multiplicative correction. An example of multiplicative correction is compensation for the operating temperature of the internal combustion engine.

It has previously been proposed to provide a second, additional multi-vibrator circuit which is in operation during the start-up period of the internal combustion engine to provide for additive correction of the injection time, and which increases the total pulse period of the pulses provided by the first multi-vibrator. This arrangement can also be used to compensate for the temperature of the internal combustion engine, but it acts additively. It has been found, however, that multiplicative correction is better. This was not possible with the previously proposed injection system.

The injection times to inject fuel to the cylinders of internal combustion engines in automotive use vary widely, for example, in the range of from 2 to 8 msec., that is, in the ratio of 1 to 4. This wide variation places severe requirements on the injection system which became complicated. It has also been found that at high engine speeds the injection of known arrangements may become irregular, because the multi-vibrator controlling the injection time of the valves has an insufficient time period to recover from the unstable state and to revert back to its stable state before a subsequent pulse is to be delivered. If the multivibrator circuit cannot completely recover, injection may become irregular and the engine may misfire or skip.

It is accordingly an object of the present invention to provide an electronically controlled fuel injection system which provides a proper amount of fuel to injection valves of internal combustion engines for all operating conditions or requirements.

It is another object of the present invention to provide such a system for automotive engines which is flexible in operation and capable of adapting to various conditions encountered in driving a vehicle, and compensate for variations in operating parameters of the engine.

It is still another object of the present invention to provide an electronic fuel injection control system utilizing a monostable multivibrator circuit which can recover completely even at high-speed operation of the engine.

It is still another object of the invention to provide a fuel injection control system in which compensation for variations in operating parameters can be made additively as well as multiplicatively.

It is still another object to provide a fuel injection control system which is compensated for variations in supply voltage, and engine temperature, and provides additional fuel for starting.

It is still another object of the present invention to provide a fuel injection system in which the opening time of valves is computed based on operating parameters of the engine.

SUBJECT MATTER OF THE PRESENT INVENTION

A pair of monostable multivibrators have their outputs applied to an OR gate. The pulse duration of the first multivibrator is made dependent on an operating parameter of the engine, for example, vacuum in the intake manifold. The pulse duration of the second multivibrator is electronically controlled to depend on the pulse duration of the first multivibrator so that it functions as a multiplier circuit; the starting point, in time, of the pulse of the second multivibrator follows the pulse of the first multivibrator and is controlled thereby. The composite output of the staggered pulses from the OR gate then controls the fuel injection valves, which will thus open when either multivibrator furnishes a pulse.

It has been found particularly advantageous to arrange the timing of the pulses of the second multivibrator in such a manner that its pulse duration increases non-linearly with increasing pulse time of the pulses of the first multi-vibrator. A small variation in pulse time of the first multi-vibrator can thus cause a larger variation in the pulse time of the second multivibrator and thus also cause a larger variation of the injection time. A ratio of pulse periods of the first multi-vibrator of 3:1 can then correspond to a ratio of injection time of 4:1.

The fuel injection system of the present invention can be thought of as a computer to which signals are applied depending on sensed operating parameter or conditions of the entire engine system (i.e. the engine and accessories, such as electrical supply), and which then calculates the proper pulse period applied through the OR gate to control the injection valves, and thus control the injection time for proper and more suitable combustion of fuel under all operating conditions to which the engine is subjected.

The structure, organization, and operation of the invention will now be described more specifically with reference to the accompanying drawings, in which:

FIG. 1 is a schematic circuit diagram of an injection control system, partly in schematic presentation, and FIGS. 2 to 5 are diagrams illustrating the operation of the fuel injection system of the present invention.

Referring now to the drawings, and in particular, FIG. 1: The injection control system will be illustrated in connection with a four-cylinder automotive type internal combustion engine 10, having spark plugs 11, connected to an ignition system not shown. Electromagnetically-operated fuel injection valves 13 are located immediately adjacent to the inlet valves (not shown) to the cylinders of engine 10 and between the stubs branching off from inlet manifold 12. The four valves 13 together form the fuel injection system. Fuel is supplied to each of the valves 13 over an individual line 14 from a distribution tank 15. Fuel is pumped into the distribution tank 15 by a pump 16 from a supply tank 17, so that it will be supplied under pressure to the valves 13. Pump 16 can be driven electrically or directly from engine 10 as indicated schematically by the broken lines.

One terminal of the operating coils of valves 13 is connected to chassis. The valves 13 are connected in groups of two, the two left valves (with respect to FIG. 1) being connected over resistances 18 to the collector of a pnp power transistor 22; the two right valves 13 are connected, each, over a resistance 19 with the collector of a pnp power transistor 23. The emitters of the two power transistors 22, 23 are connected to a positive bus 24, connected with the positive terminal of a battery 25, forming the source of operating potential for the circuit. The negative terminal of the battery 25 is connected to negative bus 26, and with chassis. The battery 25 is preferably a 12 volt automotive type battery as customarily used in vehicles.

The bases of the two power transistors 22, 23 are alternatively connected to the output of an OR gate 28 by a transfer switch 27, connected as shown, which is operated by a cam driven in synchronism with the engine, for example by being driven from the cam-shaft, as schematically indicated by the broken line. OR gate 28 includes a npn transistor 29, and has a pair of inputs, including coupling resistances 106, 107, connected to the base of transistor 29. One of the inputs to the OR gate 28 is the output of the monostable multivibrator 32, having a pair of npn transistors 33, 34. The other input to the OR gate 28 is the output of a multiplier circuit 35, which includes a second monostable multivibrator having a pair of pnp transistors 36, 37 and an npn transistor 38. The multiplier circuit 35 is connected to a timing circuit 39, which also contains an npn transistor 40. The pulse duration $T_2$ of the multiplier circuit 35 and the pulse duration $T_1$ of the first multi-vibrator 32 are related approximately in accordance with the function $$T_2 = b \cdot T_1 - a \quad (1)$$

wherein $a$ is a function of the voltage of battery 25, and $b$ is a function of the temperature of the engine. The total injection time $T$, determined by the duration of the output pulse obtained from OR gate 28 will then be $$T = T_1 + T_2 \quad (2)$$

This total injection time $T$ can be varied in a ratio of 1:4 which otherwise is difficult to obtain. It is seen that the temperature of the engine has a multiplicative influence on the impulse period $T_2$ and hence on injection time; the influence of the potential of battery 25 is additive. Additionally, impulse period $T_2$ can be extended upon starting of the engine to provide a richer mixture as will be described.

Figure 2:
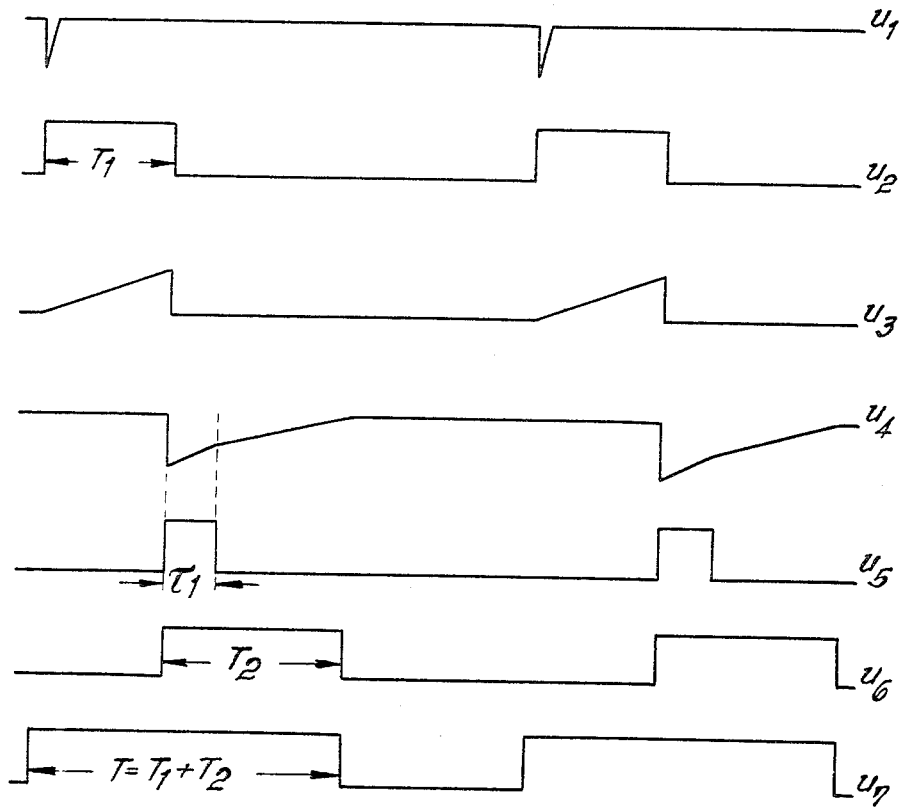

The chain-dotted lines in FIG. 1 indicate OR gate 28, monostable multivator 32, multiplier circuit 35, including the second monostable multivibrator and timing circuit 39 in block form. In detail: the emitters of transistors 33, 34 are directly connected to chassis. The base of transistor 33 is connected with a cathode of a diode 43 and over a resistance 44 to chassis. The anode of diode 43 is connected to a junction 45. Junction 45 is further connected to the anodes of two diodes 46, 47 and to a resistance 48. The other terminal of resistance 48 connects to positive bus 24. The cathode of diode 46 is connected to a resistance 49, the other terminal of which connects to the negative bus 26, and to one electrode of a condenser 52, the other electrode of which is connected to a junction point 53. Junction point 53 is connected over a resistance 54 with the positive bus 24 on one side, and over an interrupter switch 55 to the negative bus 26. Interrupter switch 55 is closed twice during each revolution of the camshaft of engine 10, by being contacted by a cam 56 having two rises. During each closing of the switch 55, a negative pulse is applied to junction 53, which is differentiated in the RC network formed of resistance 49 and condenser 52, as indicated by the wave shape beneath condenser 52 in FIG. 1. Diode 46 only passes the negative half of the differentiated wave which occurs upon closing of the contact 55. This potential will appear as potential $u_1$ at junction 45, and is also shown in FIG. 2, first graph.

The cathode of diode 47 connects to one terminal of a winding 57 of a transducer 58, the other terminal of which connects to a junction point 59. Junction point 59 is the tap point of a voltage divider formed of resistances 62, 63 and connected across positive and negative buses 24, 26. Change of the potential at junction point 59 changes the impulse period $T_1$ of the multivibrator circuit multiplicatively; this may be desirable to obtain dependence of pulse time $T_1$ on the speed of rotation of engine 10. (See U.S. Patent 3,338,221.)

The collector of transistor 33 is connected over a resistance 64 with positive line 24, and over a resistance 65 with the base of transistor 34. The collector of transistor 34 is connected through primary winding 66 of the transducer 58 and over a series resistance 67 to positive bus 24.

Transducer 58 has a movable iron core 68, which is connected by means of a linkage, schematically indicated by broken line 69, with the diaphragm of a vacuum chamber 72, connected to inlet manifold 12 of engine 10. Vacuum chamber 72 comprises an evacuated metal box similar to the kind used in aneroid barometers. A control throttle 73 is located at the input to inlet manifold 12 and behind an input air filter 74. Throttle 73 can be opened or closed by means of an accelerator pedal 75. When pedal 75 is depressed, throttle 73 opens and the vacuum in intake manifold 12 decreases, moving iron core 68 of the transducer 58 into the space between the coils 57, 66 and thus increasing the impulse period of multivibrator 32, thus providing for a longer opening time of valves 13 and increase in the amount of fuel injected to the cylinders of engine 10. Conversely, if throttle 73 is closed, the vacuum in inlet manifold 12 increases and the core 68 is moved by the vacuum chamber 72 outwardly from the transducer 58, in the direction of the arrow, so that the inductivity of the primary winding is decreased and the injection period likewise decreases, thus blocking diode 43 and transistor 33. Transistor supplied to engine 10.

The operation of the monostable multi-vibrator 32 is well known and need be described only briefly: If the interrupter contact 55 is opened, transistor 33 is conductive and transistor 34 is blocked. Upon closing of contact 55, a negative pulse $u_1$ (see also FIG. 2) is applied to junction 45, thus blocking diode 43 and transistor 33. Transistor 34 then becomes conductive and conducts current over primary winding 66. This current rises exponentially to a maximum value which is determined by the internal resistance of winding 66 and of resistor 67. During this rise in current, the secondary 17 will having an exponentially decreasing potential induced therein, which retains the base of transistor 33 at chassis potential. As soon as this potential has decreased below the value at which diode 43 blocks, the base of transistor 33 again becomes more positive and transistor 33 becomes conductive, at the same time blocking transistor 34. The elapsed time during which the base of transistor 33 is held at chassis potential depends on the inductivity of the primary winding 66 and thus on the position of core 68 within transducer 58.

Positive potential impulses $u_2$ (FIG. 2) will appear at the collector of transistor 33, which are synchronized with the speed of rotation of engine 10. The pulse duration time, $T_1$, depends upon the position of core 68 within transducer 58 (see FIG. 2—graph $u_2$).

The base of transistor 36 of the second monostable multi-vibrator 35 is connected directly with the collector of transistor 33 and thus has pulses $u_2$ applied thereto. The emitter of transistor 36 connects over an adjustable resistance 76 to the positive bus 24. The collector of transistor 36 is connected to one terminal of a capacitor 77, the other terminal of which connects to the collector of transistor 37. The charging potential of this condenser 77 essentially determines the impulse period of the second multi-vibrator 35. A diode 78 connects the other terminal of condenser 77, and thus also the collector of transistor 37 to the base of a transistor 38 and to a resistance 79 and to chassis.

The emitter of transistor 37 is connected over an adjustable resistance 82 with positive line 24, and to the cathode of a diode 83. The anode of diode 83 connects to an adjustable resistance 84 and then to a junction 85. Junction point 85 is connected to the anode of a Zener diode 86 the cathode of which connects to the positive bus 24. Junction 85 is further connected by a resistance 87 to the negative bus 26.

The base of transistor 37 is connected to one tap point of a voltage divider formed of resistance 88 (connected to the positive bus 24) and resistances 91, 92 (connected to negative bus 26). Tap point 93, between resistances 91 and 92, is connected to the cathode of a diode 94, the anode of which connects to a junction 95. Junction 95 is connected over a negative temperature coefficient resistance 96 to the negative bus 26, and over a resistance 97 to positive bus 24. Additionally, junction 95 connects to the anode of a diode 98 and a resistance 103 connected in parallel with diode 98. The cathode of diode 98, and its parallel resistance 103 are connected over a resistance 100 to the negative bus 26 and further to one terminal of a switch contact of starter switch 104, the other terminal of which is connected to positive bus 24.

The emitter of transistor 38 is connected to chassis. Its collector is connected over collector resistance 105 to the positive bus 24. Further, the collector is connected to OR gate 28, that is over resistance 106 to the base of transistor 29.

OR-gate 28, and in particular resistance 107, connected likewise to the base of transistor 29, is further connected to the collector of transistor 33. The collector of transistor 29 is connected over a resistance 108 with the transfer contact of switch 27 and further, over collector resistance 109 with the positive line 24.

The anode of diode 83 further connects with the anode of a diode 112, the cathode of which is connected to the collector of a transistor 40, which is further connected over a collector resistance 113, to positive bus 24. The emitter of transistor 40 is connected to negative line 26. The base of transistor 40 is connected over a resistance 115 to negative line 26 on the one hand, and to the cathode of a diode 114 on the other. The anode of diode 114 connects to a junction 116. Junction 116 is connected over a resistance 117 to positive bus 24 and further, to one electrode of a condenser 118. The other electrode of condenser 118 is connected over a resistance 119 to resistance 107 of OR-gate 28, and thus to the collector of transistor 33. The junction 116 is therefore connected to the collector of transistor 33 over the series connection of resistance 119 and condenser 118.

Operation of the injection system in accordance with FIG. 1: Each time interruptor contact 55 closes, a negative pulse $u_1$ (see FIG. 2) is applied to junction 45, thus blocking diode 43 and transistor 33, as previously described. Positive pulses $u_2$ will appear at the collector of transistor 33 having a duration of $T_1$, in which $T_1$ is a function of the vacuum in intake manifold 12, as described above.

The pulses $u_2$ are applied over resistance 107 to transistor 29 of the OR-gate 28, so that OR-gate 28 will become conductive during the periods $u_2$, and the collector of transistor 29 will approximately have negative potential. This potential will be applied by the transfer switch 27 to either of transistors 22, 23; in the position shown in FIGURE 1, the negative potential will be applied to transistor 22, which will become conductive, thus opening the two left injection valves 13, so that fuel can be injected to the two left cylinders of engine 10. Upon the alternate position of transfer switch 27, the two right valves 13 will open and fuel will be injected into the two right cylinders of engine 10.

During the time of pulse $u_2$, transistor 40 of timing network 39 is held conductive, the pulse being applied over the R-C network 119, 118. Condenser 118 will charge to the polarity indicated by the + and − signs in FIGURE 1. Resistance 119 limits the charging current of condenser 118 in a suitable manner. The wave shape of pulses $u_2$ is improved, since the collector potential rises rapidly upon blocking of transistor 33. After the end of a pulse $u_2$, that is, when the collector of transistor 33 again becomes negative, the change in potential is transferred to function 116 over condenser 118. Diode 114 and transistor 40 will block until the condenser 118 has discharged sufficiently over resistances 117 and 119. Then transistor 40 again becomes conductive. This blocking period of the transistor 40 may be, for example, in one construction about 1 millisecond. This time has been found suitable for several types of internal combustion engines.

The collector of transistor 40 will have a positive potential $u_5$ (FIGURES 1 and 2) applied thereto during the time transistor 40 is blocked. Pulses $u_5$ follow immediately after pulses $u_2$, as can be seen in FIGURE 2.

Transistor 36 of the second multivibrator, circuit 35, likewise has the positive pulses $u_2$ applied to the base thereof. During each pulse $u_2$, the base of transistor 36 will have a potential applied thereto which is intermediate the potential of the positive and negative buses 24, 26. Let it be assumed that battery 25 has a normal potential of 12 volts, with positive line 24 at reference potential of 0 volt; the base of transistor 36 will then have a potential of −6 volts applied thereto. The emitter of transistor 36 will have a potential which is slightly more positive, for example, —5.4 v. due to the potential drop across the emitter-base path. Accordingly, during the time $T_1$ of the pulse $u_2$, the collector current through transistor 36 is approximately constant, which charges condenser 77 linearly with respect to time. Transistor 36 thus serves as a constant current source, the current through which can be regulated by adjustment of resistance 76. The potential at the left electrode of condenser 77 is illustrated at $u_3$ in FIGURES 1 and 2.

Transistor 33 again becomes conductive at the end of pulse $u_2$. At that point, the base potential of transistor 36 suddenly jumps to a high negative value, for example —11.5 v. (with reference to positive bus 24). The collector of transistor 36 likewise becomes more negative, and this jump of collector potential is transferred by condenser 77 over diode 78 to the base of transistor 38. Transistor 38 will block simultaneously with the end of pulse $u_2$. The collector of transistor 38 then will have a positive potential $u_6$ appear thereat, which is transferred over resistance 106 to the base of transistor 29 of OR-gate 28 and maintains transistor 29 conductive. Pulse $u_6$ thus starts upon termination of pulse $u_2$. In the position of transfer switch 27 shown in FIG. 1, pulse $u_6$ continues to maintain the two left injection valves 13 in the open position so that the injection time of the two left valves is extended beyond the impulse period $T_1$ of the first multivibrator circuit 32. In the same way, the two right valves 13 will be maintained open during the following pulse period.

Condenser 77 discharges over transistor 37, resistance 82, and transistors 36 and 33. The collector-base path of transistor 36 has current passing therethrough in reverse direction, that is, opposite the normal current flow.

The use of the second multivibrator has various advantages. One advantage is that the components of the first multivibrator 32, and particularly the transducer 58, can be chosen for shorter impulse periods $T_1$ than the total injection time. Another advantage is, that the second multivibrator, in accordance with the invention, can operate as a multiplier circuit to provide multiplicative correction, for example, to compensate for change in temperature of the internal combustion engine 10, apart from additive corrections, for example, to compensate for changing potential in the source of supply, that is, battery 25. As an example for an additive correction, let it be assumed that the correction for a certain lower battery voltage is 0.3 msec. The total injection time of $T=8$ msec. is then increased to about 8.3 mesc. An injection time of $T=2$ msec. is increased to about 2.3 msec. Under multiplicative correction, it should be understood that the total impulse period is extended by a multiplicative factor; for example, left it be assumed that the temperature of internal combustion engine 10 is low and is to be extended by 20 percent. A normal injection time of $T=8$ msec. is then increased to about 9.6 msec. A normal injection time $T=2$ msec. is increased to about 2.4 msec. It will be understood by those skilled in the art that the indicated mathematical relationships need not be strictly observed to obtain satisfactory results.

The use of a monostable multivibrator circuit with a multiplier circuit outputs of which are added (with respect to time) in an OR-gate has the advantage of improved, more reliable and uniform fuel injection, because of the two multivibrators, each need only have a shorter impulse period individually than the total injection time. If a comparatively large amount of fuel is to be injected while the engine is operating at high speed and only a single multivibrator circuit is provided, then the ratio of impulse period of this multivibrator to the total duration of a switching cycle becomes great. Certain engines may require a switching cycle of 9 msec., which would mean that for an injection period of 8 msec., only 1 msec. is available for the multivibrator to recover and to supply a new subsequent pulse. This time of 1 msec. may be insufficient for complete recovery of a single multivibrator, so that the subsequent pulse may become shorter or be skipped entirely, thus resulting in irregular fuel injection.

In accordance with the present invention, the total injection time T is a composite of the two single impulses $T_1$, derived from multivibrator 32, and $T_2$, derived from multiplier circuit 35. Each one of these single, partial pulses $T_1$ and $T_2$ are shorter than the entire pulse T; for example, each may have a duration of 4 msec. In the above example, for a complete cycle of 9 msec. and a total injection time of 8 msec., each one of the multivibrators will have a recovery time of $4+1=5$ msec. It is thus possible to operate the electronic multivibrator circuits in conjunction with high speed engines and still completely control the injection of fuel, because the injection time for all valves is still governed by the impulse time of the first multivibrator.

The combination of the timing circuit 39 with the second multivibrator has the addition advantage, that as the impulse period $T_1$ increases, the increase of the impulse period $T_2$ can be made non-linear with respect thereto. In particular, initial increase of time which is greater than the increase rate of the impulse period $T_1$ can be obtained. Thus, a function in accordance with the Equation 1 above can readily be obtained. The factors $a$ and $b$ can, as above noted, represent a function of battery potential and of temperature of the engine 10, respectively. This system then enables a larger ratio of maximum to minimum duration of injection time than would be possible if the impulse period $T_1$ only were changed. This greater band width, or range of change, is highly desirable, since the amount of fuel used in automative engines should have a ratio of change of about four to one, and such a ratio of impulse period is otherwise very difficult to obtain.

When transistor 38 in the second monostable multivibrator 35 is blocked, then transistor 40 in timing circuit 39 is likewise blocked, and its collector is positive (see potential $\mu_5$ in FIGURE 2). Diode 112 is then blocked, whereas diode 83, resistance 84 and Zener diode 86 will carry current which increases the emitter and collector current of transistor 37. Condenser 77 thus discharges faster so long as transistor 40 is blocked. As soon as transistor 40 becomes conductive, that is, after a time $\tau_1$, its collector will have approximately the potential of the line 26. Current will flow from junction 85 over resistance 84, diode 112 and through transistor 40 to chassis. Zener diode 86 provides a constant potential at junction 85 with respect to positive line 24. This current causes a potential drop across resistance 84 and applies a negative bias to the anode of diode 83, which will block. The emitter-collector current of transistor 37 will decrease, and condenser 77 will discharge slower. When condenser 77 has discharged sufficiently, the base of transistor 38 again becomes positive, transistor 38 will become conductive and thus its collector negative thus defining the end of time period $T_2$. The OR-gate 28 will not receive positive potential anymore and transistor 29 will block. This terminates the injection time of the two left valves 13 (in the position of transfer switch 27 shown in FIG. 1). The total injection time is T, which is a composite of the impulse period $T_1$ of the first multivibrator 32 and the impulse period $T_2$ of the second multivibrator 35 so that the Equation 2 above is satisfied.

Figure 5:
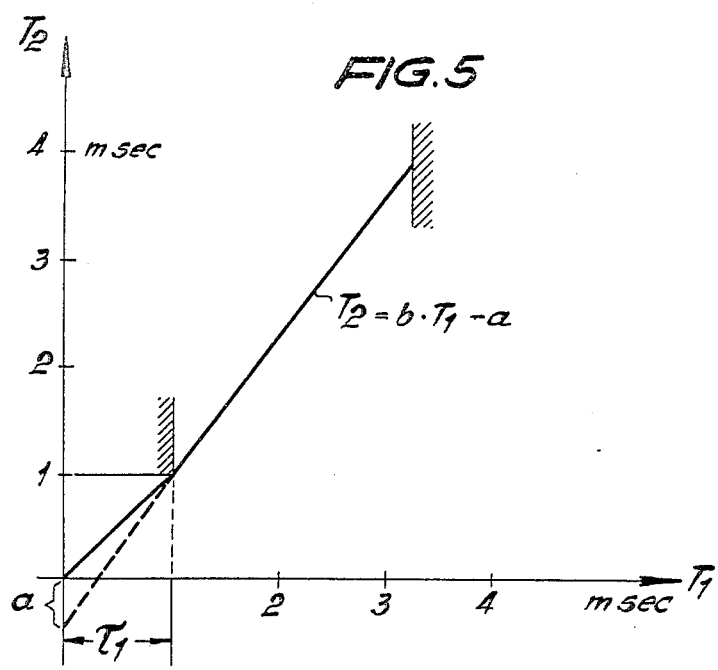

FIGURE 5 illustrates the relationship between the impulse periods $T_1$ and $T_2$ of the two multivibrators 32, 35 when both the temperature of the engine 10 and the battery potential of battery 25 are constant. In the first region, that is, for example, in a pulse period $T_1$ of from 0 to 1 msec. (which actually does not arise in operation), the relationship between $T_1$ and $T_2$ is linear. These periods are within the impulse period $\tau_1$ of the timing circuit 39. Above this impulse period, $T_2$ increases faster than $T_1$. In the example illustrated this occurs in the entire range of the impulse period $T_1$ used in operation, that is, from 1 to 3 msec., to which impulse periods $T_2$ of from 0.9 to 3.5 msec. correspond. Thus, the entire impulse period, and thus the injection time, can vary from 1.9 to 6.5 msec., that is, a ratio of 1:3.5. As seen, the impulse period $T_2$ satisfies the Equation 1 above within the range actually used in operation.

The second multivibrator 35 further compensates for variations in the potential of battery 25 and for temperature changes requiring different fuel supply of the engine 10, by suitable change of the impulse period $T_2$. This then results in a change in the total injection time T (see Equation 2 above). In addition, enrichment of the mixture during starting can be provided for in order to supply more fuel to the fuel-air mixture, automatically, upon start-up. All of these corrections can readily be done by influencing the discharge time of the condenser 77, by varying the parameters of its discharge circuit.

Figure 3:
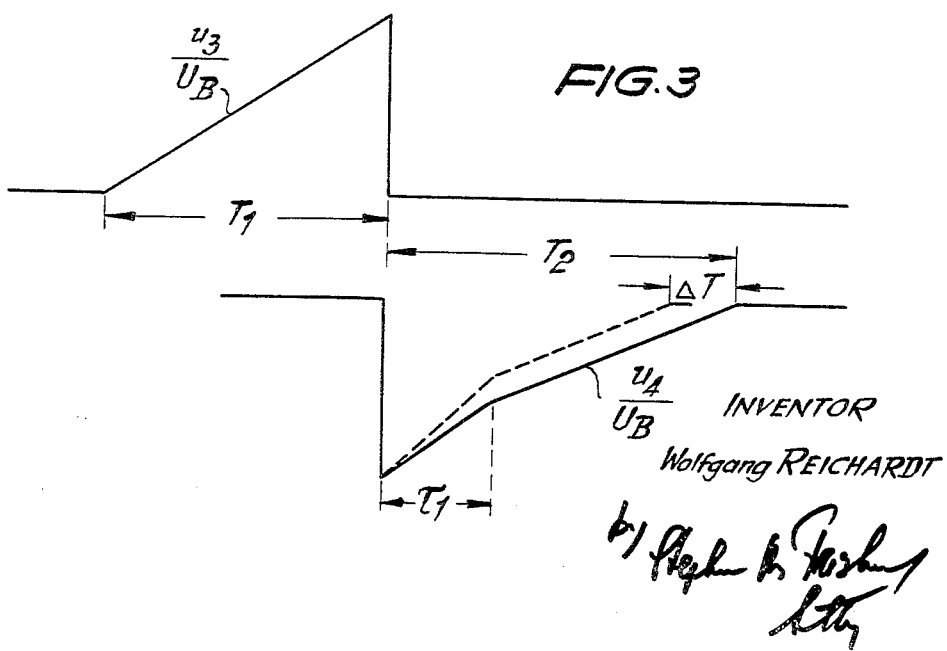
Figure 4:
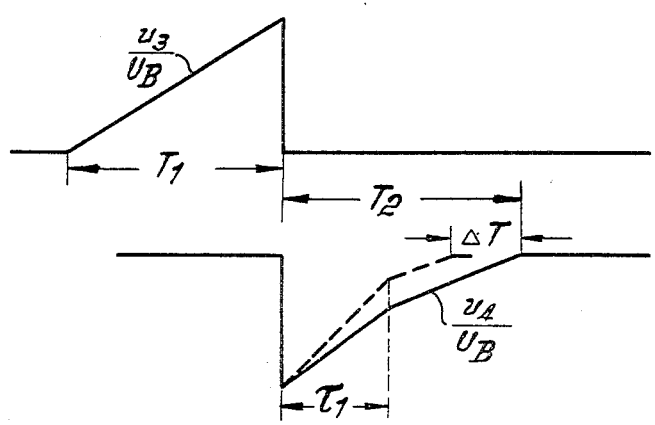

*Correction of variations of battery potential:* The injection valves 13 are influenced by variations in the operating potential supplied by battery 25, since at higher impulse potential, the injection valves 13 will open faster than at smaller impulse potentials. Since the operating potential also influences the potentials of the pulses, a constant impulse period causes a larger amount of fuel to be injected when the operating potential of battery is higher than when the operating potential drops. FIGURES 3 and 4 illustrate potential curves, with respect to time, for various battery potentials $U_B$. Since both potentials $u_3$ as well as $u_4$ depend on the operating potential $U_B$, the values $u_3/U_B$ and $u_4/U_B$ are shown. These curves thus illustrate percentages operating potential, that is, they refer to a per-unit representation.

The curve $u_3/U_B$ illustrates in each instance the potential on condenser 77, with time, during charging with a constant current. Curve $u_4/U_B$ shows the potential at the collector of transistor 37 during discharge of condenser 77. During the time $\tau_1$, transistor 40 is blocked. During this time diode 112 is blocked over resistance 113 so that current can flow through diode 83, resistance 84 and Zener diode 86, which is added to the current through resistance 82 and thus accelerates the discharge of condenser 77 during the time $\tau_1$.

The shape of the curve $u_3/U_B$ does not change with increase of operating potential $U_B$. However, the current flowing over diode 83, resistance 84 and Zener diode 86 increases more than linearly, since the potential across Zener diode 86 is practically constant. The curve $u_4/U_B$, with increased operating potential, is shown in FIGURES 3 and 4 by the curve in broken lines. The discharge of condenser 77 increases during the time $\tau_1$ and remains constant after the time $\tau_1$. Thus, as the operating potential $U_B$ increases, the impulse period $T_2$ is decreased by the value $\Delta T$. This decrease in pulse time does not result in a decrease of injected fuel, however, because increase in operating potential $U_B$ causes faster operation of the valves 13 so that the amount of fuel supplied to the cylinders will be the same as with a lower operating potential.

FIGURE 3 illustrates the potential distribution with a long impulse period, whereas FIGURE 4 illustrates the potential distribution with a short impulse period. In both case, the full line curves illustrate the relationships with a predetermined, lower battery potential, and the broken line curves illustrate the relationships with a predetermined higher operating potential. In both instances, the decrease $\Delta T$ of the impulse period is the same, that is, this correction acts additively. In actual practice it has been found that such additive correction provides for optimum performance of the engine. This correction thus corresponds to the factor $a$ in the Equation 1 above.

*Correction for variations in engine temperature:* The engine temperature determines to a certain extent the proportion of fuel and air in the mixture supplied to the engine. Below a predetermined temperature, which depends on the type and design of the engine, the mixture requires a larger amount of fuel, often referred to as an "enriched" mixture. So long as the engine is cold, more fuel has to be injected.

Negative temperature of co-efficient resistance 96 is mounted in heat-transfer relationship to the engine 10, or, for example, to its cooling water circuit. At low engine temperatures, for example, upon starting, this resistance has a high value and thus junction 95 has a more positive potential than junction 93, so that current can flow over diode 94. This will cause the base potential of transistor 37 to become more positive, or, in other words, the resistance of transistor 37, in the discharge circuit of condenser 77, is increased. Thus, at lower temperatures, of engine 10, the discharge time of condenser 77, and with it the impulse period $T_2$, is increased. Resistance 100 prevents too much fuel from being injected at very low temperatures. If with such low temperatures junction 95 becomes more positive than the cathode of diode 98, current will flow over diode 98 and prevent further increase of the potential at junction 95. This very simple arrangement prevents overly rich mixtures at very low temperatures. Diode 98 thus interconnects the tap point of a voltage divided 96, 97 and the tap point of another voltage divider formed of resistances 100, 103 and 97.

As soon as the engine has reached its operating temperature, for example, at about 80° C., the resistance of negative temperature co-efficient resistance 96 becomes very low and diode 94 blocks. Resistance 96 thus has no effect on the impulse period $T_2$ above this temperature, which is determined by the relative value of resistances 91 and 92.

The increase of the discharge time of the condenser 77 occurs during the entire period during which condenser 77 discharges. Thus, if the time $T_2$ is to be long, then the increase will be greater than if the time $T_2$ is to be short. The correction is thus multiplicative and corresponds to factor ($b$) of the Equation 1 above.

*Start correction:* It is desirable to have an enriched mixture during starting. This is obtained, as above described, by increasing the discharge time of condenser 77 and thus increasing the impulse period $T_2$. Upon starting, contacts 104 of starting switch are closed. Junction point 93 is made more positive by application of current through resistance 103 and diode 94, increasing the discharge time of the condenser 77 as described. At the same time, the cathode of diode 98 is placed at the potential of the positive bus 24, so that diode 98 will remain blocked regardless of the temperature of the engine during starting. Thus, an enriched mixture is supplied upon starting.

The circuit of the present invention provides for additive as well as multiplicative correction without mutual influence of these correction factors upon each other, while at the same time permitting wide swings in impulse periods to control the injection valves even at high speeds of the engine. In effect, operating conditions of the engine (supply potential, temperature, start-up condition) are sensed, and the injection time for the injection valves computed and controlled in accordance with predetermined relations established by the circuits and their parameters.

The invention has been illustrated and described in connection with a four-cylinder engine for automotive use. It is not intended to be limited to the details shown and various modifications and structural changes, as determined by requirements of the engine with which it is to be used, and the environment of the engine and its requirements may be made without departing from the inventive concept.

I claim:

1. Fuel injection control system for internal combustion engines having electrically controlled fuel injection means, comprising a first pulse generator circuit pulsed in synchronism with rotation of the engine and providing a first output pulse;

means controlling the pulse duration of the pulse from said first pulse generator circuit as a function of an operating parameter of the engine;

a multiplier circuit, connected to and controlled by said first pulse generator circuit and providing a second output pulse having a start time controlled by said first pulse and a pulse duration which is a function of the pulse duration of said first output pulse;

an OR-gate connected to the output of said first pulse generator circuit and to the output of said multiplier circuit and having the pulses of both said circuits applied thereto;

and means connecting the output of said OR-gate to said fuel injection means to control said fuel injection means so that the amount of fuel injected will be determined by the combined total pulse duration of said first pulse and said second pulse of both said circuits.

2. System as claimed in claim 1 including means controlling the pulse duration of the multiplier circuit as a function of the pulse duration of said first pulse generator circuit, said means having a non-linear transfer relation at least within part of the range of pulse durations of said first pulse generator circuit.

3. System as claimed in claim 1 including means controlling the pulse duration of said multiplier circuit as a function of the pulse duration of said first pulse generator circuit, said means having a transfer relationship which is variable throughout its range by a predetermined factor, whereby the pulse duration of said second pulse will be multiplicatively changed with respect to said first pulse.

4. System as claimed in claim 1 including means controlling the pulse duration of said multiplier circuit as a function of the pulse duration of said first pulse generator circuit, said means having a transfer relationship which includes an additional factor, whereby the pulse duration of said second pulse will be additively changed with respect to said first pulse.

5. System as claimed in claim 1 including means controlling the pulse duration of said multiplier circuit, said means having a transfer relationship which is variable throughout its range by a first factor and additionally includes a second factor, whereby the pulse duration as appearing at said OR-gate will be a composite of the pulse duration of said first pulse as generated by said pulse generator circuit and said first pulse as changed multiplicatively by said first factor as well as additively by said second factor.

6. System as claimed in claim 1, including means sensing an additional operating parameter of the engine; and means controlling the multiplication factor and thus pulse duration of said multiplier circuit as a function of said additionally sensed parameter.

7. System as claimed in claim 1 wherein said pulse generator circuit comprises a first monostable multivrator circuit (32) and said multiplier circuit comprises a second monostable multivibrator (35) including a condenser (77);

means controlled by the pulse duration of said first pulse charging said condenser during the pulse duration of said first monostable multivibrator and discharging said condenser upon termination of the pulse of said first multivibrator, the pulse duration of said second multivibrator thus being dependent on the charge of said condenser.

8. System as claimed in claim 7 wherein said means charging said condenser includes a constant current source.

9. System as claimed in claim 7 wherein said second multivibrator includes a discharge circuit for said condenser (77) having controllable resistance means (37) connected therein; and means controlling the resistance of said controllable resistance means as a function of an operating parameter of the engine.

10. System as claimed in claim 7 wherein said second multivibrator circuit has a charge-discharge circuit determining its pulse duration and means are provided controlling said second multivibrator circuit as a function of the pulse period of said first multivibrator circuit including a timing circuit (39) controlled by said first multivibrator circuit, said timing circuit being connected to and controlling the rate of change of charge of said charge-discharge circuit.

11. System as claim in claim 10, wherein said timing circuit includes a non-linear element to cause rapid discharge of said discharge circuit immediately after termination of a pulse of said first multivibrator for a predetermined period.

12. System as claimed in claim 11, wherein said predetermined period is not greater than the shortest pulse duration of said second multivibrator.

13. System as claimed in claim 11 for use with a source of electrical power of varying voltage, wherein means sensing the voltage of said source are provided and said second multivibrator circuit includes a control network to control the time-decay of said discharge circuit in accordance with sensed voltage of said source, said control network being effective during said predetermined period.

14. System as claimed in claim 7 wherein said discharge circuit includes the emitter-collector path of a transistor (37) and an emitter resistance (82) connected across said source;

and said control network includes a Zener diode (86) and a resistor (84) in series, and connected in parallel to said emitter resistance (82) to have at least a portion of the discharge current from said condenser applied thereto; and means connecting said Zener diode across said source whereby, upon increased voltage, of said source, a portion of discharge current through the Zener diode increases non-linearly.

15. System as claimed in claim 7, wherein said second multivibrator circuit includes a discharge circuit for said condenser having an element of variable resistance value to affect the discharge rate of said condenser; and means controlling the value of said variable-value element in accordance with the temperature of the engine.

16. System as claimed in claim 15, wherein said element of variable value is the emitter-collector path of a transistor (37);

and said means controlling the value of said element comprises a negative temperature co-efficient resistance (96) located in heat-conductive relation with respect to said engine and connected to control the resistance of the emitter-collector path of said transistor (37) to increase the current through the transistor upon increase in engine temperature and thus decrease pulse time.

17. System as claimed in claim 11 wherein said timing circuit (39) includes a timing network transistor (40) and a timing network condenser (118) connected in the base circuit of the transistor (40), and connected to be charged rapidly from the output of said first multivibrator circuit (32) to a value independent of the pulse duration of said first pulse;

the discharge circuit of said second multivibrator (35) including the emitter-collector path of a discharge control transistor (37) and an emitter-resistance (82);

and the collector circuit of said timing network transistor (40) is interconnected (86, 84, 83) with the emitter resistance (82) of said transistor (37) to increase the collector current of said discharge control transistor (37) and thus increase the discharge rate of said discharge circuit until said timing network condenser is discharged to a predetermined value, the duration of said discharge of the timing network condenser up to said predetermined value defining said predetermined period.

18. System as claimed in claim 7, wherein said second multivibrator circuit includes a discharge circuit for said condenser (77); a starter switch is provided; and means interconnecting said starter switch and said discharge circuit to increase the discharge time of said condenser.

19. System as claimed in claim 18, wherein said discharge circuit includes the emitter-collector path of a transistor (37) and said means interconnecting said starter switch (104) and said discharge circuit includes a network (88, 91, 92, 95, 97, 98, 100, 103) activated upon operation of said starter switch and decreasing the collector current of said transistor (37) to increase the discharge time of said discharge circuit and thus increase pulse time.

20. System as claimed in claim 1 including means sensing termination of the pulse period of said first pulse generator circuit, said means controlling and triggering the start of the pulse from said multiplier circuit to said OR-gate to obtain a continuous output from said OR-gate composed of sequential first and second pulses.

21. Fuel injection control system for internal combustion engines having electrically controlled fuel injection means comprising
  a first monostable multivibrator circuit pulsed in synchronism with the rotation of the engine;
  means controlling the pulse duration of said first multivibrator circuit as a function of an operating parameter of the engine;
  a multiplier circuit comprising a second monostable multivibrator circuit;
  means sensing termination of said pulse from said first monostable multivibrator circuit and controlling the start of pulses of the second multivibrator circuit upon such sensed termination of a pulse generated by said first multivibrator circuit;
  means controlling the pulse duration of said second multivibrator circuit as a function of the pulse period of said first multivibrator circuit including time-decay means to essentially determine the pulse duration of said second multivibrator circuit;
  a timing circuit connected to said first multivibrator circuit and operative for a predetermined time period immediately upon termination of a pulse from said first multivibrator circuit, said timing circuit being connected to said time decay means to affect the decay rate during said predetermined time period of said timing circuit;
  network means sensing and responsive to a second operating parameter of the engine and connected to and varying the rate of time decay of said time-decay means;
  and gating means gating the pulses of both said first and second multivibrator circuits and connected to said fuel injection means to control the injection time of fuel in accordance with a composite pulse formed of the sequential pulses of both said multivibrator circuits.

22. System as claimed in claim 21 including means sensing a third operating parameter of the engine and a control connection from said sensing means to said timing means and to said network means to additionally control the time decay rate of said time-decay means for a predetermined period less than the pulse duration of said second multivibrator and effective immediately upon the start of the pulse from said second multivibrator.

23. System as claimed in claim 21, wherein said predetermined time period is less than or equal to the shortest pulse duration of said second multivibrator.

24. System as claimed in claim 22, wherein said third operating parameter is the voltage of an electric power source of said system, said network being connected to increase the time decay rate as said sensed voltage increases, so that the pulse duration of said second multivibrator circuit decreases with increasing voltage.

25. System as claimed in claim 24, wherein said time decay circuit includes a condenser and a discharge circuit for said condenser; a transistor having an emitter resistance in said discharge circuit; a voltage divider having a tap point connected to the base of said transistor and connected across said source of potential; a circuit including a Zener diode and a resistance, in series, connected across said source of potential; and means connecting the junction of said resistance and said Zener diode in parallel with said emitter resistance, whereby, upon rise of battery potential, the discharge current for said condenser, flowing over the Zener diode, increases non-linearly.

26. Fuel supply apparatus for an engine system having an internal combustion engine, a source of fuel and a source of electrical power; first pulse generating means comprising a first monostable multivibrator circuit generating first pulses of electrical current in synchronism with the rotation of the engine;
  control means connected to said pulse generating means continuously varying the pulse duration of said monostable multivibrator circuit in accordance with an operating parameter of the engine system;
  a multiplier circuit including second pulse generating means connected to the output of said first multivibrator the pulse generating means being triggered by the termination of said first pulses and being controlled by said pulses to produce second pulses having a duration which is a function of the duration of the first pulses;
  means electrically adding said first and said second pulses, to provide a composite output pulse;
  and means actuated jointly by the composite output pulse formed of said consecutive first and second pulses for supplying fuel to the engine.

27. Apparatus as claimed in claim 26, including means sensing an operating condition of said engine system, said means being connected to and controlling said multiplier circuit to control the functional relationship of the pulse duration of the second pulses produced by said multiplier circuit as a function of a sensed operating condition.

28. System as claimed in claim 27 wherein said sensing means controls said multiplier circuit to modify the pulse length of the second pulses proportionately by an amount computed from multiplicatively operative characteristic of an operating condition of the engine system.

29. Fuel injection control system for internal combustion engines having electrically controlled fuel injection means comprising
  a plurality of pulse generating circuits, all said pulse generating circuits being pulsed continuously upon operation of the engine and in synchromism with the rotation thereof, the start of pulses of individual pulse generating circuits being staggered, in time, with respect to each other;
  means controlling the pulse period of one of said pulse generating circuits as a function of a first operating condition of the engine;
  means interconnecting said one and the others of said pulse generating circuits and controlling the pulse duration of said other pulse generating circuits to be a function of the pulse period of said one pulse generating circuit;
  means applying a composite of the staggered, interrelated, pulses, from said pulse generating circuits to said fuel injection means to control the amount of fuel injected by the period of time from the beginning of the first pulse applied thereto until the termination of the last;
  and means modifying the pulse period of at least one of said pulse generating circuits as a function of a second operating condition of said engine.

30. System as claimed in claim 29, wherein a pair of pulse generator circuits are provided, the pulse period control means being effective to control the pulse period of both said pulse generating circuits;

and the pulse of the second of said pair of said generator circuits follows immediately upon termination of the pulse from the first of said pulse generating circuits.

31. System as claimed in claim 29, including sensor means sensing said second operating condition of said engine;

said means modifying the pulse period including an electrical network having elements of variable valve therein connected to compute the extent of modification of said pulse period as a function of operating conditions of the engine sensed by said sensor means.

32. System as claimed in claim 31, including a source of potential of varying voltage, wherein said sensor includes a voltage sensitive circuit connected to sense the voltage value of said source; and said means modifying the pulse period comprises a time-decay circuit and said network, controlling the time-decay of said circuit in accordance with sensed voltage of said source during a predetermined time period.

33. System as claimed in claim 31, wherein said sensor includes a temperature sensitive circuit connected to sense the temperature of said engine; and said means modifying the pulse duration comprises a time-decay circuit and said network, said network controlling the time-decay of said circuit in accordance with sensed temperature of said engine during substantially the entire pulse duration thereof.

34. System as claimed in claim 31, for use with an engine having a starter circuit, wherein said sensor includes a circuit sensing starting condition of the engine; and said means modifying the pulse duration comprises a time-decay circuit in said network, said network controlling the time-decay in said circuit in accordance with sensed start-up condition of the engine.

References Cited

UNITED STATES PATENTS

| | | | |
|---|---|---|---|
| 3,005,447 | 10/1961 | Baumann et al. | 123—119 |
| 3,051,152 | 8/1962 | Paule et al. | 123—119 |
| 3,240,191 | 3/1966 | Wallis | 123—32 |
| 3,338,221 | 8/1967 | Scholl | 123—32 |

LAURENCE M. GOODRIDGE, Primary Examiner

U.S. Cl. X.R.

123—119, 140